Dec. 29, 1936.  E. E. TRAFTON  2,065,768
FILTER
Filed Oct. 27, 1934
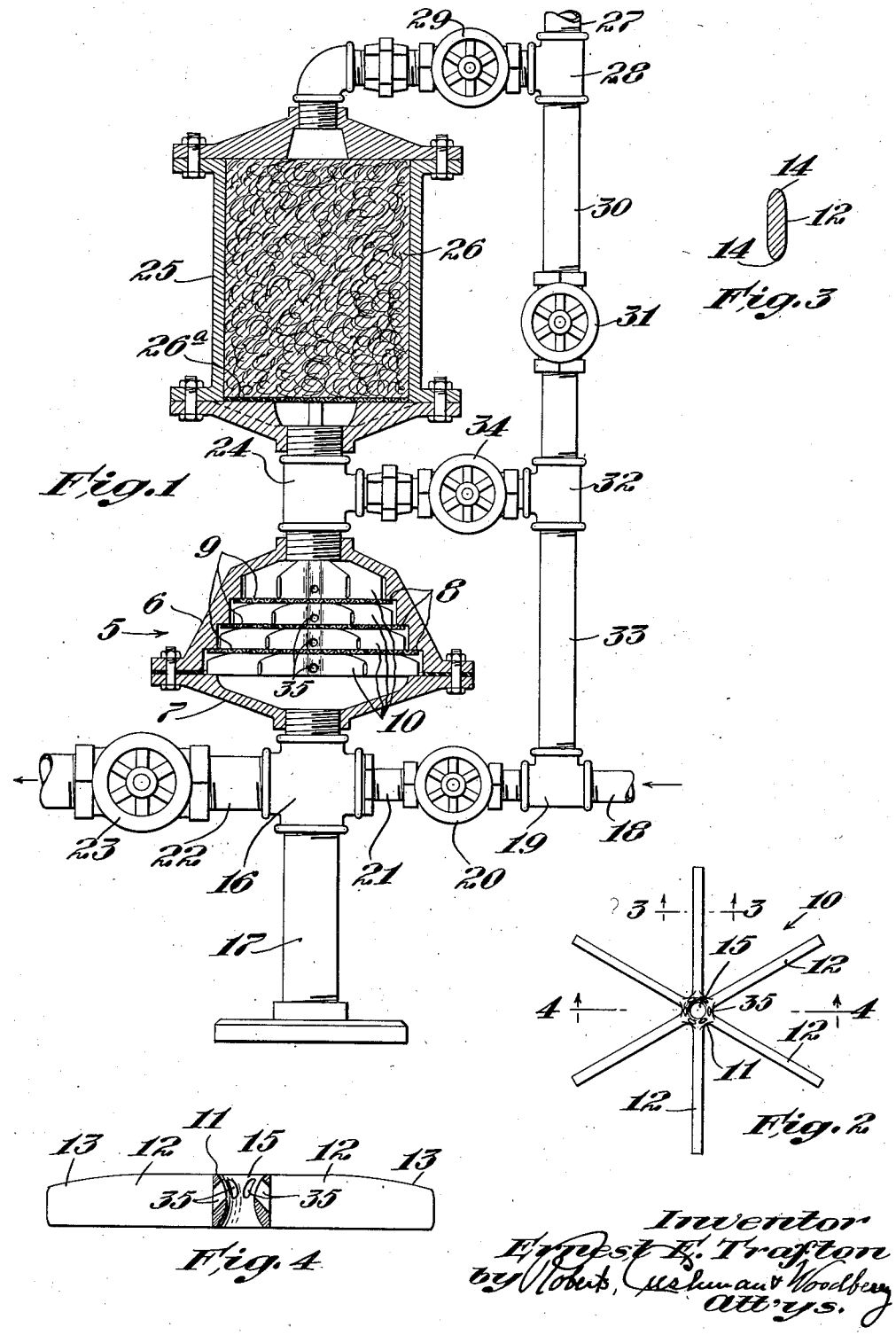
Inventor
Ernest E. Trafton
by Roberts, Cushman & Woodberry
Att'ys.

Patented Dec. 29, 1936

2,065,768

UNITED STATES PATENT OFFICE 2,065,768

FILTER

Ernest E. Trafton, Boston, Mass., assignor to Avite Products, Inc., Charlestown, Mass., a corporation of Massachusetts Application October 27, 1934, Serial No. 750,331

11 Claims. (Cl. 210—164)

This invention relates to filters of the general character described in Letters Patent of the United States No. 1,906,932 granted to me May 2, 1933. The present invention has to do primarily with the action of the filtering screens and the mode of supporting the filtering screens in the body and consists in the modifications and improvements hereinafter described and set forth in the claims.

In the accompanying drawing which illustrates a preferred embodiment of the invention, Fig. 1 is a vertical elevation, partly in section, of the filter containing the invention, and its associated fittings;

Fig. 2 is a plan view of one of the skeleton frames for supporting the filtering screens;

Fig. 3 is a sectional detail on line 3—3 of Fig. 2; and

Fig. 4 is a section on line 4—4 of Fig. 2.

The main filter which embodies the invention is indicated generally at 5 and comprises the casing or body 6, which may be a metal casting of generally conical shape closed at its lower and larger end by a removable cover 7. The body 6 is made with a plurality of internal annular shoulders 8, which constitute a series of seats of different diameters for the several filtering screens 9. The filtering screens 9 consist of discs of flexible wire mesh, preferably monel metal woven wire mesh. The filtering screens are preferably of graduated fineness, the largest and lowermost screen which the water first encounters in the process being filtered being of the coarsest mesh and the succeeding screens being of progressively finer mesh.

The filtering screens 9 are supported in position normally to engage their respective seats 8 by a series of rigid skeleton frames 10, which alternate with and are interposed between the screens so that each screen is engaged between two such skeleton frames disposed on opposite sides. Each skeleton frame 10 is preferably in the form of a cast metal spider having a central hub 11 and a series of radial arms 12 (Figs. 2 and 4). The lowermost and largest frame 10 is rigidly supported in the body 6 by means of the cover 7. Resting upon that frame is the first filtering screen and then alternately are positioned the succeeding frames and screens, the topmost frame abutting against or being integral with the top of the body 6. Thus the alternate frames and screens directly engage one another and rest upon one another in a substantially solid column.

The top or supporting surface of each arm 12 of the frames is inclined away from the screen resting thereon toward the ends of the arms as indicated at 13 (Fig. 4). Consequently each filtering screen is supported in fixed position at its middle area only, while the periphery or margin of the screen is normally left unsupported by the frame below it. Each arm 12 is also preferably tapered in opposite directions, both upward and downward, as indicated at 14 (Fig. 3), so as to reduce the extent of the surfaces which contact with the screens on both sides, thus reducing the liability of accumulating dirt or extraneous matter between the engaging or contacting surfaces of the frames and the screens. The taper for producing this result may be either in the form of rounded surfaces or flat beveled surfaces. For the same purpose of reducing the extent of contacting surfaces the central hub 11 of the spider is preferably made with a hole 15, (Fig. 2 and Fig. 4).

Although I have herein shown and described the preferred form of skeleton frames, each comprising a spider having a central hub and radial spokes, it is to be understood that my invention in its broader aspects is not limted to that particular construction but embraces other forms of skeleton frames having sufficiently open-work construction to permit the free passage of water and having screen supporting elements so disposed as to afford adequate support for the flexible screens, while permitting the margins only of the screens to flex away from their seats during backwashing.

The filter 5 is mounted on a pipe coupling 16, which in turn is supported by a pedestal 17. The water supply enters through a main pipe 18, coupling 19, valve 20 in the pipe connection 21 between couplings 16 and 19, and coupling 16 which communicates with the interior of the body 6 through the cover 7. A waste pipe 22 is also connected to coupling 16 and is controlled by a valve 23.

The water to be filtered passes upward through the filtering screens 9 and skeleton frames 10, thence to the coupling 24 and into the chamber 25 of a secondary filter or purifier, which may be filled with any desired filtering medium or purifying material or chemical charge, indicated conventionally at 26, for further treating the water either physically or chemically. A screen 26a of suitable wire mesh may be provided in the bottom of chamber 25.

From the chamber 25 the filtered and purified water passes to a coupling 28 and pipe 27, which leads to the water system of a building or a municipality or other place where the filtered water is to be used. The connection from the chamber 25 to the coupling 28 is controlled by a valve 29. A pipe 30 extends from coupling 28 to a coupling 32 and is controlled by valve 31. A pipe 33 connects coupling 32 with coupling 19. There is also a pipe connection between coupling 32 and coupling 24 controlled by a valve 34.

In normal operation for filtering the water entering from the main 18, valve 20 is opened, valve 23 is closed, valve 29 is opened and valves 31 and 34 are closed. The water is thus caused to flow through the filter 5 and the chamber 25 and thence to the pipe 27 of the system to be supplied.

In order to cleanse the filter of any accumulation of dirt, sediment or other impurities which collect on the screens during the filtering operation, the flow of the water is reversed or backwashed through the filter by closing valve 20 and opening valves 31 and 23. Valve 29 remains open and valve 34 remains closed. The water from the main 18 will then flow through pipes 33, 30, chamber 25, filter 5 and thence to waste through pipe 22. Backwashing takes but a short time, usually only a few seconds. But even during this short time there is no necessity of interrupting the supply of water to the service pipe 27, which will receive unfiltered water through pipes 33 and 30. If it be desired that no unfiltered water pass into service pipe 27, even for the short time required for backwashing, pipe 27 could obviously be supplied with a cut-off valve. If it be desired to backwash only the filter 5 without at the same time backwashing the chamber 25, valve 20 is closed, valve 29 is closed and valves 34 and 23 are opened. The flow of the backwash now takes place through pipe 33, valve 34, coupling 24, filter 5 and thence to waste through pipe 22. Under these conditions a supply of unfiltered water may be delivered to the service pipe 27, without interrupting the service, by leaving valve 31 open. If it is not desired to admit unfiltered water to the service pipe 27, valve 31 is closed.

During the normal flow of the water upward through filter 5 the pressure of the water on the under sides of the filtering screens 9, supplemented by the natural resiliency of the screens, holds the margins of the screens against their respective seats 8, the middle area of each screen being held against bulging or collapsing under the water pressure by the skeleton frame immediately above it. All the water therefore has to pass through the filtering screens which cleanse it of dirt and foreign matter.

During the reverse flow of the water, or backwash, through filter 5 the margin of each screen is caused to flex away from its seat by the fluid pressure on the upper side, this being permitted by the downward inclination of the supporting surface at the periphery of the skeleton frames, as exemplified by the inclined ends 13 of the arms 12, while the middle area of each screen is supported in fixed position by the middle area of the skeleton frames.

The under surface of each skeleton frame lies in a substantially flat plane coincident with the seat for the screen immediately below the frame in question, so that during the normal filtering operation the screens are held in flat position by the seats 8 and the bottom surfaces of the frames, thus obviating any tendency to distort the screens under the pressure of the water flowing through them.

It will be understood that chamber 25 may be omitted if no further treatment of the water is desired in addition to the filtering in filter 5; or, additional chambers similar to 25 may be used if necessary to take care of additional purification problems, whether physical or chemical.

In order further to facilitate and increase the cleansing effect of the backwash, a side passage 35 may be provided in the hub 11 between each pair of arms 12 of each spider. Each side passage 35 preferably extends from the upper part of the flared bore 15 downwardly and outwardly at an inclination to the plane of the spider so that part of the water passing downwardly into the bore 15 during backwashing will be diverted through the side passages 35 causing the streams emerging from the passages 35 to impinge against the screens immediately below at a slant and thus to assist in directing a flow of water from the center outwardly toward the edge of the screen, so as to wash dirt or sediment which may be deposited on top of the screen toward and over its edge, at the same time permitting a substantial flow of the backwashing water through the mesh of the screen to cleanse its under side. The agitation of the water thus caused, as well as its directions of flow, assists in washing out the dirt.

I claim:

1. A filter comprising a body having an internal annular seat, a flexible filtering screen engaging the seat, and a skeleton frame to support the screen in position normally to engage the seat, said skeleton frame being so constructed and arranged as to engage and support the middle area of the screen but to leave the margin of the screen unsupported, whereby said margin of the screen may flex away from the seat when subjected to fluid pressure on the side away from the frame.

2. A filter comprising a body having an internal annular seat, a flexible filtering screen engaging the seat, and a skeleton frame to support the screen in position normally to engage the seat, said frame having parts which are inclined away from the screen at its periphery to permit the margin of the screen to flex away from the seat when subjected to fluid pressure on the side away from the frame.

3. A filter comprising a body having an internal annular seat, a flexible filtering screen engaging the seat, and a skeleton frame to support the screen in position normally to engage the seat, said frame comprising a spider having radial arms, the outer ends of which are inclined away from the screen to permit the margin of the screen to flex away from the seat when subjected to fluid pressure on the side away from the spider.

4. A filter comprising a body having an internal annular seat, a flexible filtering screen engaging the seat, and a skeleton frame to support the screen in position normally to engage the seat, said frame comprising a spider having radial arms, the outer ends of which are inclined away from the screen to permit the margin of the screen to flex away from the seat when subjected to fluid pressure on the side away from the spider, and the arms of the spider on the side engaging the screen being tapered to reduce the area of the surface contacting with the screen.

5. A filter comprising a body having an internal annular seat, a flexible filtering screen engaging the seat, and a skeleton frame to support the screen in position normally to engage the seat, said frame comprising a spider having a central hub and radial arms, said hub having an axial hole therethrough, and said arms being inclined away from the screen toward their ends and being also tapered on the side engaging the screen to reduce the extent of the surface contacting with the screen.

6. A filter comprising a body having a plurality of internal annular seats, a flexible filtering screen engaging each seat, and a skeleton frame for supporting each screen, said frames being so constructed and arranged as to engage and support the middle area of the screens but to leave the margins of the screens unsupported, thereby to permit the margins of the several screens to flex away from their respective seats when subjected to fluid pressure on the side away from the frames.

7. A filter comprising a body having a plurality of internal annular seats, a flexible filtering screen engaging each seat, and a series of rigid skeleton frames alternating with and interposed between the screens, each screen being engaged between two such frames disposed on opposite sides thereof, and the surface of each frame facing the next adjacent seat being inclined away from the contiguous screen, thereby to permit the margins of the screens to flex away from their respective seats when subjected to fluid pressure on the sides away from said inclined surfaces.

8. A filter comprising a body having a plurality of internal annular seats, a flexible filtering screen engaging each seat, a series of skeleton frames alternating with and interposed between the screens, each screen being directly engaged between two skeleton frames disposed on opposite sides thereof, and each frame comprising a spider having radial arms the opposite edges of which constitute screen supporting surfaces, the surfaces facing the next adjacent seat being inclined away from said seat to permit the margin of the screen on that side of the spider to flex away from its seat, the opposite surface of each spider which engages another screen on that side being in a substantially flat plane coincident with the plane of the seat for the latter screen.

9. A filter comprising a body having a plurality of internal annular seats, a flexible filtering screen engaging each seat, and means to support said screens in fixed position at their middle areas only, leaving the margins of said screens unsupported, whereby said margins of the screens will engage their respective seats when subjected to fluid pressure in the direction toward the seats and will flex away from their seats when subjected to fluid pressure in the opposite direction.

10. A filter comprising a body having a plurality of internal annular seats, a flexible filtering screen engaging each seat, and a series of skeleton frames alternating with and interposed between the screens, each screen being directly engaged between two skeleton frames disposed on opposite sides thereof, the screen engaging surfaces severally facing the next adjacent seats being inclined away from said seats to permit the margins of the screens to flex away from respective seats when subjected to fluid pressure on the sides away from the inclined surfaces, and the opposite surface of each frame which engages another screen being in a substantially flat plane coincident with the seat for the latter screen.

11. A filter comprising a body having a plurality of annular seats, a flexible filtering screen engaging each seat, and a series of skeleton frames alternating with and interposed between the screens adapted to permit the margins of the screens to flex away from their seats, each frame comprising a spider having a central hub and radial arms, the hub having a central hole and side passages extending laterally through the hub from the central hole to the exterior of the hub.

ERNEST E. TRAFTON.